(12) United States Patent
Hanashima et al.

(10) Patent No.: US 7,106,937 B2
(45) Date of Patent: Sep. 12, 2006

(54) OPTICAL WAVEGUIDE AND METHOD OF FABRICATING THE SAME

(75) Inventors: Naoki Hanashima, Tokyo (JP); Reio Mochida, Tokyo (JP)

(73) Assignee: TDK Corporation, (JP)

( * ) Notice: Subject to any disclaimer, the term of this patent is extended or adjusted under 35 U.S.C. 154(b) by 147 days.

(21) Appl. No.: 10/810,392

(22) Filed: Mar. 26, 2004

(65) Prior Publication Data

US 2005/0163445 A1    Jul. 28, 2005

(30) Foreign Application Priority Data

Jan. 27, 2004 (JP) .............................. 2004-018838

(51) Int. Cl.
G02B 6/10    (2006.01)
(52) U.S. Cl. ..................... 385/129; 385/130; 385/131
(58) Field of Classification Search ............... 385/129, 385/130, 131
See application file for complete search history.

(56) References Cited

U.S. PATENT DOCUMENTS

| | | | |
|---|---|---|---|
| 5,117,470 A * | 5/1992 | Inoue et al. ................. 385/14 |
| 5,904,491 A | 5/1999 | Ojha et al. |
| 6,044,192 A | 3/2000 | Grant et al. |
| 6,389,209 B1 * | 5/2002 | Suhir ........................ 385/129 |
| 6,528,338 B1 | 3/2003 | Bazylenko |
| 6,704,487 B1 * | 3/2004 | Parhami et al. ............. 385/129 |
| 2002/0025133 A1 * | 2/2002 | Nara et al. ................... 385/129 |
| 2002/0039474 A1 | 4/2002 | Kilian et al. |
| 2002/0122650 A1 * | 9/2002 | Kominato et al. .......... 385/131 |
| 2003/0000918 A1 | 1/2003 | Kheraj et al. |
| 2003/0031445 A1 * | 2/2003 | Parhami et al. ............. 385/129 |
| 2003/0041624 A1 * | 3/2003 | Won ........................... 65/386 |
| 2003/0044151 A1 * | 3/2003 | Zhong et al. ............... 385/129 |
| 2003/0152353 A1 | 8/2003 | Inoue et al. |
| 2004/0170368 A1 * | 9/2004 | Childs et al. ............... 385/129 |

FOREIGN PATENT DOCUMENTS

| | | |
|---|---|---|
| JP | H3-75606 | 3/1991 |
| JP | 07-318739 | 12/1995 |
| JP | 09-297237 | 11/1997 |
| JP | 10-142436 | 5/1998 |
| JP | 10142436 A | 5/1998 |
| JP | 2002-250831 | 2/2001 |
| JP | 2002-189139 | 7/2002 |
| JP | 2003-014959 | 1/2003 |

OTHER PUBLICATIONS

Office Action from related Japanese Patent Application No. 2004-018838.

* cited by examiner

Primary Examiner—Kaveh Kianni
(74) Attorney, Agent, or Firm—Young Law Firm, P.C.

(57) ABSTRACT

An optical waveguide comprises a silica substrate, a buffer layer formed on the silica substrate, cores formed on the buffer layer, and upper cladding layer formed on the buffer layer, covering the cores. The thermal expansion coefficients of the buffer layer and upper cladding layer are set to be substantially equal. As a result, the stresses in the cores are isotropic, effectively suppressing birefringence.

20 Claims, 5 Drawing Sheets

Fgiure5
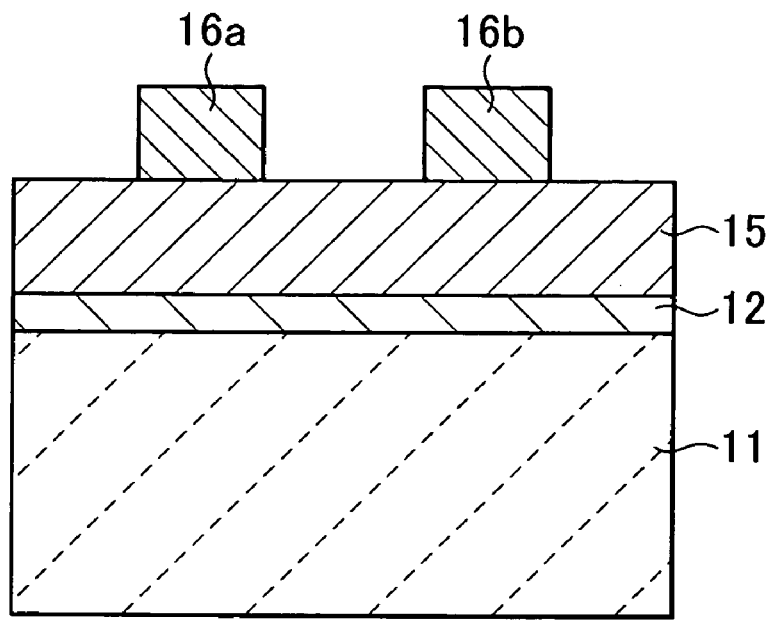
Fgiure6
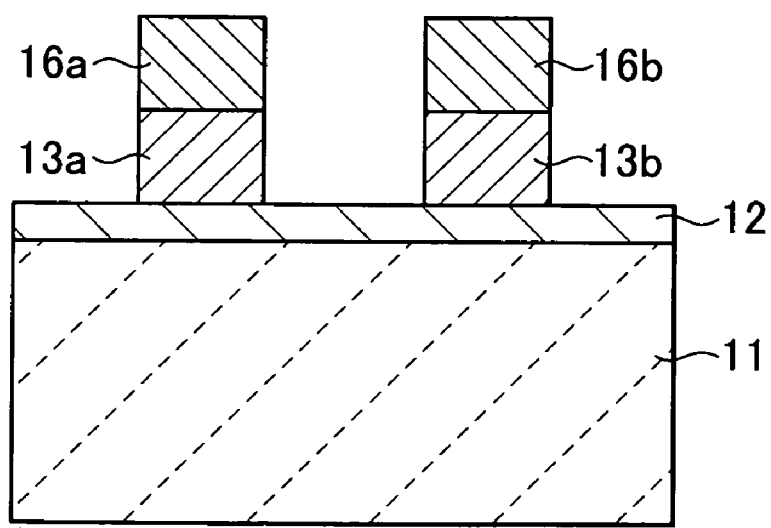

Fgiure 7
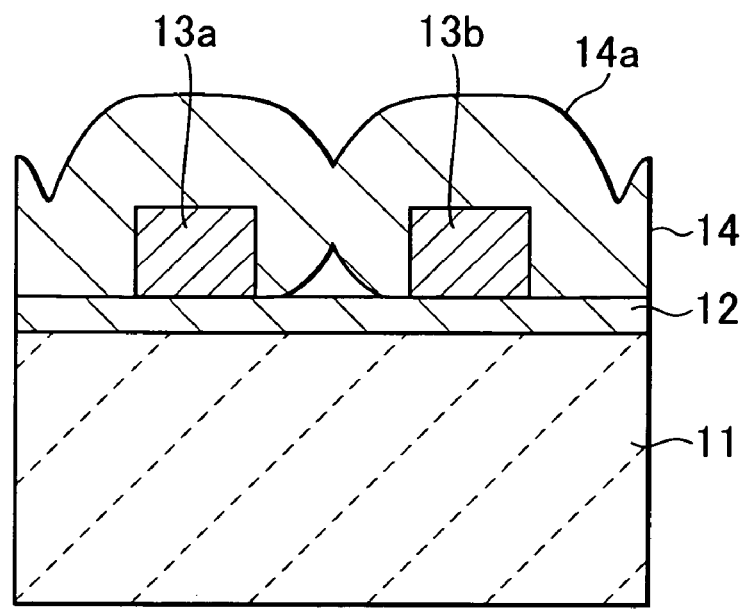
Figure 8
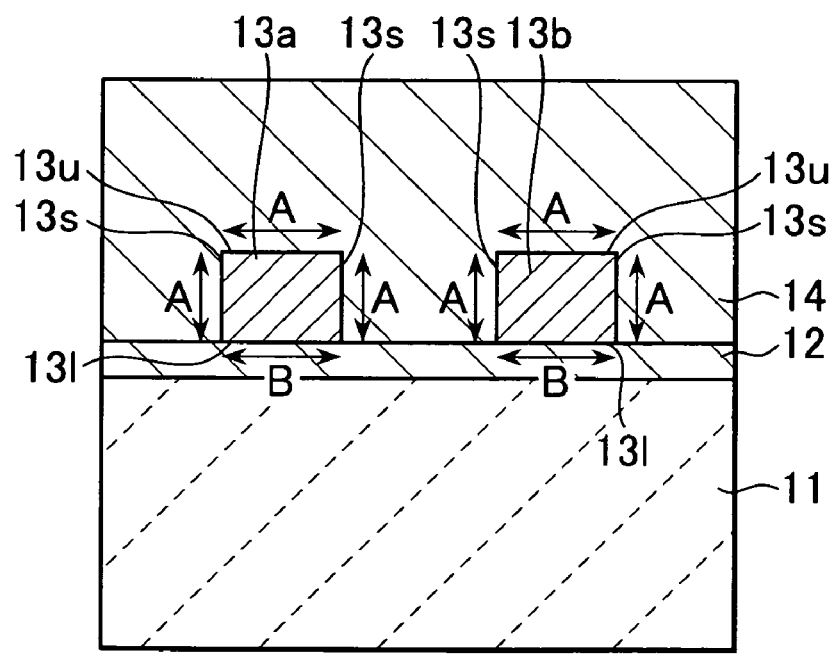

OPTICAL WAVEGUIDE AND METHOD OF FABRICATING THE SAME

TECHNICAL FIELD

The present invention relates to an optical waveguide and a method of fabricating the optical waveguide, and more particularly to a planar optical waveguide that uses a silica substrate, and a method of fabricating the same.

BACKGROUND OF THE INVENTION

In recent years optical communication is being widely used for the high-speed transmission of large amount of information. Optical waveguides used in optical communications can be broadly divided into optical fiber and planar type optical waveguides. The prior art includes planar optical waveguides comprising a silicon substrate, lower cladding provided on the silicon substrate, a core provided on the lower cladding, and upper cladding layer provided on the lower cladding, over the core (see Japanese Patent Application Laid Open No. 7-318739).

In an optical waveguide having this composition the refractive index of the silicon substrate is considerably higher than the refractive index of the core, so care must be taken to prevent light leaking from the core to the silicon substrate. For this reason, the lower cladding must be sufficiently thick, 20 µm for example. It results in a long fabrication time.

In contrast, there is another type of planar optical waveguide that comprises a silica substrate, a core provided on the silica substrate and upper cladding layer provided on the lower cladding, covering the core (see Japanese Patent Application Laid Open No. 9-297237). In the case of an optical waveguide having this composition, the silica substrate has a lower refractive index than the core, so the substrate itself can function as the lower cladding. This has the merit of eliminating the need to separately form lower cladding, therefore enabling the waveguide to be fabricated using fewer fabrication steps.

However, a number of problems have been reported when a core is formed directly on the silica substrate, such as that birefringence is produced, increasing the polarization dependency. Various methods have been proposed for improving the polarization dependency and other characteristics even when using a silica substrate, such as by interposing a buffer layer between the silica substrate and the core (see Japanese Patent Application Laid Open No. 10-142436 and Japanese Patent Application Laid Open No. 2002-189139).

Japanese Patent Application Laid Open No. 2003-14959 discloses a method of decreasing the polarization dependency in an optical waveguide that uses a silicon substrate, by prescribing the range of the relationship between the thermal expansion coefficient of the upper cladding layer and the thermal expansion coefficient of the silicon substrate, and the relationship between the thermal expansion coefficient of the upper cladding layer and the thermal expansion coefficient of the lower cladding.

However, even when a buffer layer is interposed between the silica substrate and the core, birefringence has arisen, caused by differences between the thermal expansion coefficients of the core and the buffer layer, or between the thermal expansion coefficients of the core and the upper cladding layer. Such problems have been particularly pronounced when the upper cladding layer is subjected to fluidization annealing to eliminate voids between adjacent cores.

SUMMARY OF THE INVENTION

It is therefore an object of this invention to provide an optical waveguide having a silica substrate in which the birefringence can be reduced, and a method of fabricating the waveguide.

The optical waveguide according to the present invention comprises a silica substrate, a buffer layer provided on the silica substrate, at least one core provided on the buffer layer, and an upper cladding layer provided on the buffer layer and covering the core, in which a thermal expansion coefficient of the buffer layer and a thermal expansion coefficient of the upper cladding layer are substantially equal.

Here, "a thermal expansion coefficient of the buffer layer and a thermal expansion coefficient of the upper cladding layer are substantially equal" indicates that a stress in a core arisen from a difference between the thermal expansion coefficients of the buffer layer and the core is substantially equal to a stress in the core arisen from a difference between the thermal expansion coefficients of the upper cladding layer and the core, producing a state in which the stresses in the core are substantially isotropic. Consequently, while the thermal expansion coefficient of the buffer layer and the thermal expansion coefficient of the core may not be exactly the same, a difference therebetween that is not more than 30%, and preferably not more than 10%, falls within the scope of the invention, in that the stresses in the core will be substantially isotropic.

Thus, since in accordance with the present invention, the thermal expansion coefficient of the buffer layer and the thermal expansion coefficient of the upper cladding layer are substantially equal, the stresses in the core are substantially isotropic, so birefringence can be effectively suppressed.

In a preferred aspect of the present invention, the refractive index of the buffer layer is higher than the refractive index of the silica substrate. According to this aspect of the present invention, the transmission loss will be improved by reducing leakage of light to the silica substrate.

In a further preferred aspect of the present invention, the softening temperature of the upper cladding layer is lower than the softening temperature of the buffer layer. According to this aspect of the present invention, it can be possible to prevent the buffer layer from becoming fluidized during fluidization annealing of the upper cladding layer. For this, it is preferable to add at least boron (B) and phosphorus (P) to the upper cladding layer, and at least germanium (Ge) to the buffer layer. It is also preferable for the buffer layer to have a thickness that is not less than 1 µm and not more than 5 µm, in order to save the time required to deposit the buffer layer and correctly control the stresses in the core.

When the above core includes first and second cores which are separated by a narrow gap, not more than 2 µm, for example, voids readily arise between the cores, making it necessary to subject the upper cladding layer to fluidization annealing. Even when this is the case, however, since the thermal expansion coefficient of the buffer layer and the thermal expansion coefficient of the upper cladding layer are substantially equal, it is still possible to make the stresses in the cores substantially isotropic.

In another preferred aspect of the present invention, the optical waveguide further comprises another buffer layer interposed between the silica substrate and the above buffer layer, the thermal expansion coefficient of the another buffer layer is between the thermal expansion coefficients of the silica substrate and the above buffer layer. According to this aspect of the present invention, it can be possible to decrease stresses resulting from differences between the thermal expansion coefficients of the substrate and the above buffer layer.

A method of fabricating the optical waveguide according to the present invention comprises the steps of forming a buffer layer on a silica substrate by using a vapor phase deposition, forming a core layer on the buffer layer by using a vapor phase deposition, forming first and second cores by patterning the core layer, forming an upper cladding layer covering the first and second cores by using a vapor phase deposition, said upper cladding layer having a thermal expansion coefficient that is substantially equal to that of the buffer layer, and annealing the upper cladding layer to flow.

According to the present invention, since using a vapor phase deposition to form the buffer layer, core layer and upper cladding layer, it can be possible to suppress in the stresses arising from differences in deposition methods. Also, annealing to then flow the upper cladding layer ensure to eliminate voids in the small gap between the cores, even when the gap is narrow. Moreover, since the thermal expansion coefficient of the buffer layer and the thermal expansion coefficient of the upper cladding layer are substantially equal, birefringence can be effectively suppressed.

In a preferred aspect of the present invention, fabrication process includes multiple steps of upper cladding layer formation and subsequent annealing. According to this aspect of the present invention, bubbles that arise during the annealing are effectively removed.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 5 shows the formation of the masks and as part of the process of fabricating the optical waveguide shown in FIG. 1.

FIG. 6 shows the etching of the core layer as part of the process of fabricating the optical waveguide shown in FIG. 1.

FIG. 7 shows the formation of upper cladding layer as part of the process of fabricating the optical waveguide shown in FIG. 1.

FIG. 8 is a drawing for explaining the stresses in the cores.

DETAILED DESCRIPTION OF THE EMBODIMENTS

Preferred embodiments of the present invention will now be described with reference to the drawings.

Figure 1:
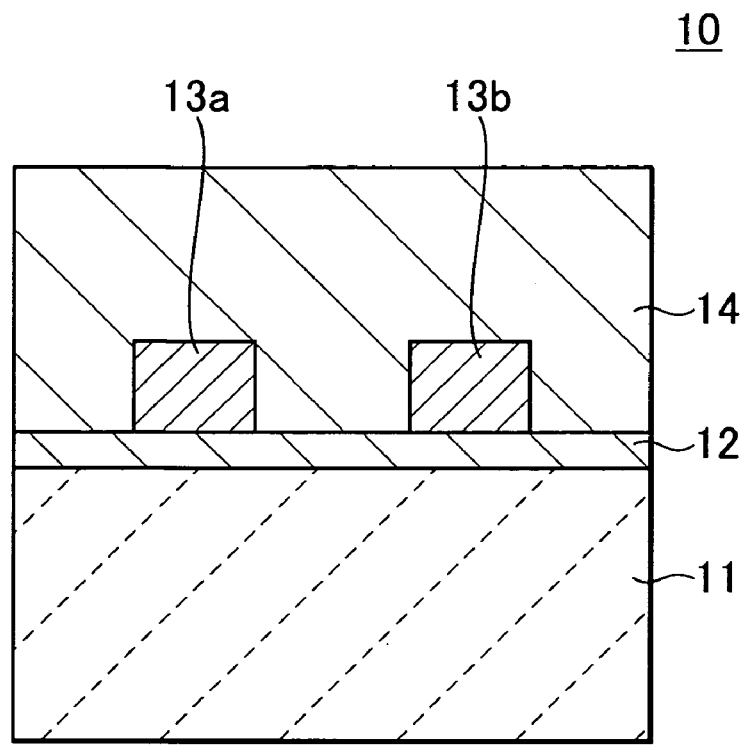
FIG. 1 is a schematic cross-sectional view of the structure of an optical waveguide that is a preferred embodiment of the present invention.

FIG. 1 is a schematic cross-sectional view of the structure of an optical waveguide 10 that is a preferred embodiment of the present invention.

As shown in FIG. 1, the optical waveguide 10 is constituted of a silica substrate 11, a buffer layer 12 provided on the silica substrate 11, first and second cores 13a and 13b provided on the buffer layer 12, and upper cladding layer 14 provided on the buffer layer 12, covering the first and second cores 13a and 13b. That is, the optical waveguide 10 according to this embodiment is a planar optical waveguide having a silica substrate. Herein, the first and second cores 13a and 13b are also referred to collectively as "core 13."

The silica substrate 11 functions as a supporting substrate to ensure the mechanical strength of the optical waveguide 10, and also functions as part of the lower cladding, which is the cladding in the downward, as viewed from the core 13. While there is no particular limitation on the material of the substrate, other than that the main constituent thereof be a silica glass material capable of functioning as cladding, it is preferable to use silica glass ($SiO_2$). With respect to light having a wavelength of 1310 nm, silica glass has a refractive index (n) of approximately 1.446. There is no particular limitation on the thickness of the silica substrate 11 other than that it should be thick enough to ensure the mechanical strength of the optical waveguide 10, such as, for example, around 0.3 to 1.0 mm.

First and second cores 13a and 13b are elements constituting separate waveguides. The cores can be formed of silicate glass that includes a prescribed dopant. A type and amount of the dopant have to be selected so that the core 13 has a higher refractive index than that of the buffer layer 12 and upper cladding layer 14. It is necessary to select a type of additive dopant that raises the refractive index. Dopants of this type include germanium (Ge), phosphorus (P), titanium (Ti) and aluminum (Al). Of these, it is preferable to select germanium (Ge) which produces the least decrease in the softening temperature. The height of the core 13 is not limited, but can be around 5 to 10 μm. The core 13 can be about as wide as it is high.

The buffer layer 12 functions as part of the lower cladding, which is the cladding in the downward direction, as viewed from the core 13, and also serves to reduce birefringence by adjusting the stresses in the core 13. The material of the buffer layer is silicate glass material to which a prescribed dopant has been added so that it can function as cladding. A type and amount of the dopant have to be selected so that the buffer layer 12 has a lower refractive index than that of the core 13, and a softening temperature that is higher than that of the upper cladding layer 14. It is also preferable for the buffer layer 12 to have a higher refractive index than that of the silica substrate 11, to eliminate leakage of light to the silica substrate 11. The most preferable dopants for satisfying the above requirements are germanium (Ge) and boron (B).

It is preferable to make the buffer layer 12 as thin as possible while still remaining thick enough to make the stresses in the core 13 isotropic. Specifically, it should be from not less than 1 μm to not more than 5 μm thick. If the buffer layer 12 is thinner than 1 μm, it will be impossible to sufficiently make the stresses in the core 13 isotropic. Also, while a thickness of 5 μm enables the buffer layer 12 to sufficiently make the stresses in the core 13 isotropic, any thickness over 5 μm has no practical utility, serving only to increase the time taken to form the layer.

The upper cladding layer 14 is the cladding in the horizontal and upper direction, as viewed from the core 13. The upper cladding layer 14 is formed of silicate glass material to which a prescribed dopant has been added so that it can function as cladding. A type and amount of dopant have to be selected so that the upper cladding layer 14 has a lower refractive index than that of the core 13, and a softening temperature that is lower than that of the material used to form the buffer layer 12. The most preferable material having a low softening temperature is silicate glass to which boron (B) and phosphorus (P) have been added to form boron-phospho silicate glass (BPSG).

It is preferable for the upper cladding layer 14 to have a refractive index that is higher than the refractive index of the buffer layer 12. That is, the upper cladding layer 14 should have a refractive index that is higher than the refractive index of the buffer layer 12 and is also higher than the refractive index of the silica substrate 11. This enables to prevent the leakage of a portion of the input light uncoupled to a waveguide from an optical fiber, to the buffer layer 12 and silica substrate 11. The upper cladding layer 14 and buffer layer 12 each has to have a refractive index that is lower than that of the core 13, since the core 13 has to have a higher refractive index than the surrounding refractive for light guided. The upper cladding layer 14 should be made as thin as possible while still being thick enough to completely cover the core 13 and suppress leakage of light upward from the core 13. If the core 13 is 7 μm in thickness, for example, thickness of around 30 μm would be suitable.

In accordance with the present invention, the thermal expansion coefficient of the buffer layer 12 and the thermal expansion coefficient of the upper cladding layer 14 of the optical waveguide 10 are set to be substantially equal. This substantially equalize the vertical and horizontal stresses in the core 13, and thereby decreasing the birefringence. The thermal expansion coefficient of the silicate glass material can be optimized by varying the type and amount of the added dopant, substantially matching the thermal expansion coefficients of the buffer layer 12 and the upper cladding layer. Dopants that can be added to increase the thermal expansion coefficient include phosphorus (P), germanium (Ge), boron (B) and aluminum (Al), while dopants that can be added to decrease the thermal expansion coefficient include titanium (Ti) and fluorine (F).

The method of fabricating the optical waveguide 10 will now be described with reference to the process drawings of FIGS. 2 to 7.

Figure 2:
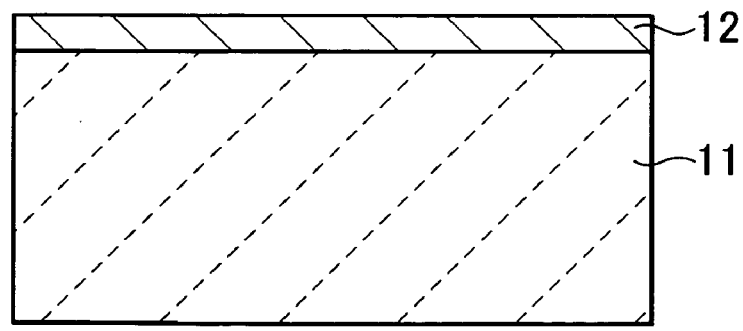
FIG. 2 shows the formation of the buffer layer as part of the process of fabricating the optical waveguide shown in FIG. 1.

As shown in FIG. 2, a buffer layer 12 is formed on a silica substrate 11. It is preferable to employ a vapor phase deposition method, such as chemical-vapor deposition (CVD), using source gas(es) that include the dopant of the buffer layer 12. More preferably, plasma-enhanced CVD (PECVD) is used in which a source gas is a mixture of tetraethoxy-orthosilicate (TEOS), tetramethoxy-germanium (TMG), trimethoxy-boron (TMB) and oxygen ($O_2$). A buffer layer 12 of silicate glass containing germanium (Ge) and boron (B) is deposited using the gas. The tetramethoxy-germanium (TMG) flow rate can be used to control the germanium (Ge) amount, and the trimethoxy-boron (TMB) flow rate can be used to control the boron (B) amount.

Figure 3:
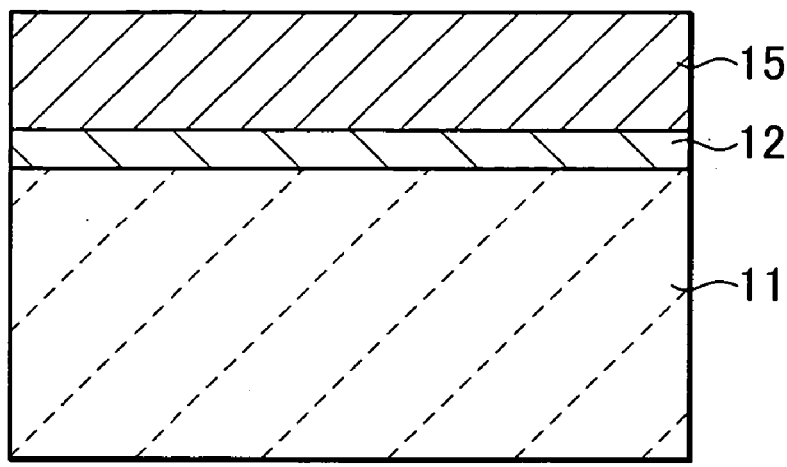
FIG. 3 shows the formation of the core layer as part of the process of fabricating the optical waveguide shown in FIG. 1.

Next, as shown in FIG. 3, a core layer 15 is formed on the buffer layer 12. The core layer 15 has the same thickness as the core 13. As in the case of the buffer layer 12, it is preferable to form the core layer 15 with vapor phase deposition, such as CVD. More preferably, plasma-enhanced CVD (PECVD) is used in which a source gas is a mixture of tetraethoxy-orthosilicate (TEOS), tetramethoxy-germanium (TMG) and oxygen ($O_2$). A core layer 15 of silicate glass containing germanium (Ge) is deposited using the gas. As described above, the tetramethoxy-germanium (TMG) flow rate can be used to control the germanium (Ge) amount. The core layer 15 with a higher refractive index than the buffer layer 12 can be formed by using a tetramethoxy-germanium (TMG) flow rate higher than that used during the forming of the buffer layer 12.

Figure 4:
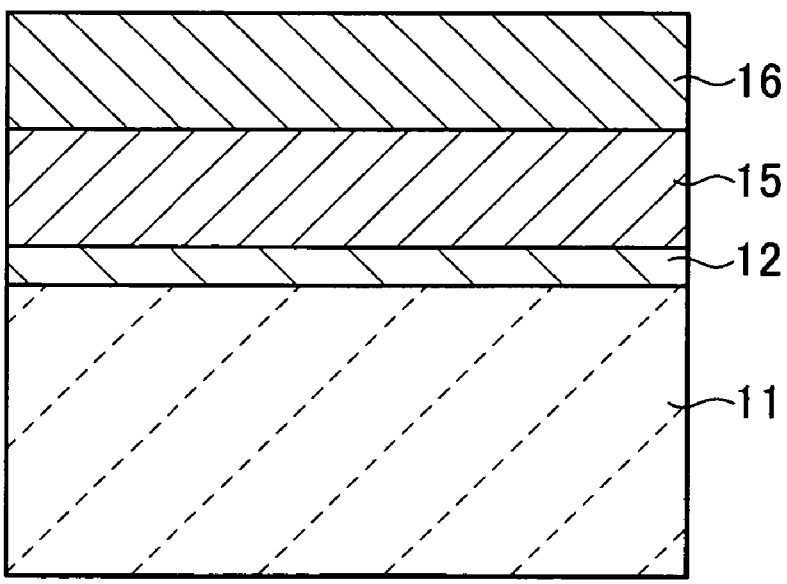
FIG. 4 shows the formation of the photoresist as part of the process of fabricating the optical waveguide shown in FIG. 1.

Next, as shown in FIG. 4, a photoresist 16 is formed on the core layer 15, and photolithography is used to remove portions other than the regions where the first and second cores 13a and 13b are to be formed, forming the masks 16a and 16b shown in FIG. 5. Then, as shown in FIG. 6, the first and second cores 13a and 13b are formed by etching away the portions of the core layer 15 not covered with the masks 16a and 16b. The masks 16a and 16b are then removed, the patterning of the core layer 15 is completed. It is preferable to use dry etching, particularly reactive ion etching (RIE) to etch the core layer 15.

Next, as shown in FIG. 7, upper cladding layer 14 is formed on the buffer layer 12, covering the core 13. It is preferable to form the upper cladding layer 14 with a vapor phase deposition method, such as CVD. More preferably, plasma-enhanced CVD (PECVD) is used in which a mixture of trimethoxy-boron (TMB), tetramethoxy-phosphate (TMP), tetraethoxy-orthosilicate (TEOS) and oxygen ($O_2$) as a source gas. The mixture can be used to form the upper cladding layer 14 of boron-phospho silicate glass (BPSG).

Forming the upper cladding layer 14 on a surface having steps will result in a surface 14a having the same steps, and the formation of a void 14b in the gap between the first and second cores 13a and 13b, as shown in FIG. 7. The void 14b will be arisen more often when the gap between the first and second cores 13a and 13b is small.

Next, annealing is carried out to fluidize the upper cladding layer 14 in order to flatten the surface 14a as well as to eliminate the void 14b. The annealing should not be carried out as a single step after the entire deposition of the upper cladding layer 14. Instead, the upper cladding layer 14 is preferably deposited and annealed with multiple steps, since this effectively removes bubbles generated during the annealing. For example, upper cladding layer 14 of 30 μm thickness, without bubbles, can be formed by depositing and annealing a cladding of 8 μm, then depositing and annealing another cladding of 11 μm, and then depositing and annealing the final cladding of 11 μm. In this way, the optical waveguide 10 is formed with a flat surface 14a and no void 14b, as shown in FIG. 1.

The core 13 in the optical waveguide 10 thus fabricated is subjected to stresses arising from differences in thermal expansion coefficient. Since in accordance with the present invention the thermal expansion coefficient of the buffer layer 12 and the upper cladding layer 14 are substantially equal, the stresses along vertical and horizontal axis in the core 13 are substantially equal, even when the thermal expansion coefficient of the core 13 is different from that of the upper cladding layer 14 and buffer layer 12. That is, as shown in FIG. 8, since all of the vertical surface of the core 13, meaning the side surface 13s, is in contact with the upper cladding layer 14, the vertical stress A is determined by the difference in the thermal expansion coefficients of the upper cladding layer 14 and core 13. With respect to the horizontal surfaces of the core 13, the upper surface 13u is in contact with the upper cladding layer 14 and the lower surface 13l is in contact with the buffer layer 12, so the stress A at the upper surface 13u is determined by the difference in the thermal expansion coefficients of the upper cladding layer 14 and core 13, and the stress B at the lower surface 13l is determined by the difference in the thermal expansion coefficients of the buffer layer 12 and core 13. In other words, the horizontal stress in the core 13 is determined by an intermediate value between the thermal expansion coefficient difference of the upper cladding layer 14 and core 13 and the thermal expansion coefficient difference of the buffer layer 12 and core 13.

In view of this, the present invention includes the buffer layer 12 and upper cladding layer 14 with substantially equal thermal expansion coefficients, which enables to substantially equalize the vertical and horizontal stresses in the core 13. That is, the stresses in the core 13 are isotropic, avoiding birefringence. This enables to provide an optical waveguide 10 with high performance.

The present invention is in no way limited to the aforementioned embodiments, but rather various modifications are possible within the scope of the invention as recited in the claims, and naturally these modifications are included within the scope of the invention.

Figure 9:
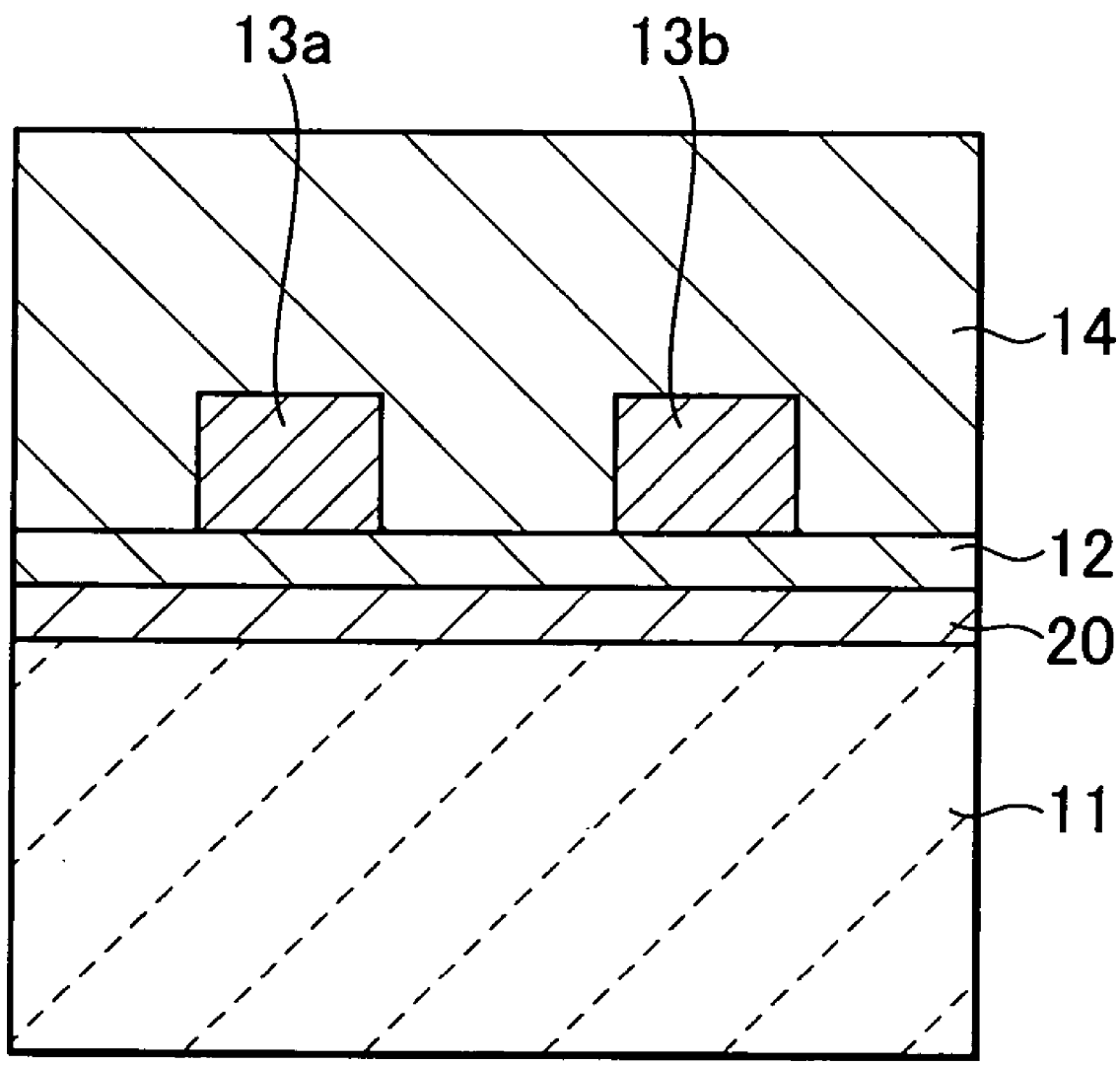
FIG. 9 is a schematic cross-sectional view of a modified version of the optical waveguide shown in FIG. 1.

For example, while in the case of the above optical waveguide 10 the buffer layer 12 is in direct contact with the silica substrate 11, as shown in FIG. 9, another buffer layer 20 may be interposed between the silica substrate 11 and the buffer layer 12 to reduce the forces arising from the difference in the thermal expansion coefficients of the silica substrate 11 and buffer layer 12. In this case, the buffer layer 20 has to be of a material with a thermal expansion coefficient being between those of the silica substrate 11 and buffer layer 12. Preferred materials include silicate glass doped with an amount of germanium (Ge) less than the amount added to the buffer layer 12.

WORKING EXAMPLES AND COMPARATIVE EXAMPLES

Here follows a description of working examples of the present invention, but the present invention is in no way limited to these examples.

Example 1

As Example 1, an optical waveguide (directional coupler) was fabricated having the structure shown in FIG. 1. Germanium (Ge) and boron (B) were added to the buffer layer; the oxide-equivalent amounts were 2.0 mol % and 4.0 mol %, respectively. Boron (B) and phosphorus (P) were added to the upper cladding layer; the added amounts were 5.0 mol % and 2.0 mol %, respectively. 5.4 mol % of germanium (Ge) was added to the core. As a result, at wavelength 1550 nm, the refractive index of the buffer layer was 1.44800, that of the upper cladding layer was 1.4483 and that of the core was 1.45409, so the refractive index of the core was approximately 0.4% higher than that of the buffer layer and upper cladding layer.

The thermal expansion coefficient of the buffer layer and of the upper cladding layer was $12.4 \times 10^{-7}/°$ C., meaning that there was effectively 0% difference between the thermal expansion coefficients. The thermal expansion coefficient of the core was $11.5 \times 10^{-7}/°$ C.

Polarization dependency of branching ratio was measured, and found to be 0.1 dB. Since a value of 0.5 dB or below is normally considered a good characteristic, this confirmed that the optical waveguide of Example 1 had very good characteristics.

Example 2

For Example 2, an optical waveguide was fabricated having the same structure as that of Example 1, except that the oxide-equivalent amounts of germanium (Ge) and boron (B) added to the buffer layer were 1.4 mol % and 1.8 mol %, respectively, the amounts of boron (B) and phosphorus (P) added to the upper cladding layer were 1.8 mol % and 1.2 mol %, respectively, and the amount of germanium (Ge) added to the core was 5.2 mol %. At wavelength 1550 nm, the refractive index of the buffer layer was 1.44761, that of the upper cladding layer was 1.44788 and that of the core was 1.45355, so the refractive index of the core was approximately 0.4% higher than that of the buffer layer and upper cladding layer.

The thermal expansion coefficient of the buffer layer was $8.0 \times 10^{-7}/°$ C. and that of the upper cladding layer was $8.8 \times 10^{-7}/°$ C., meaning that there was a difference of about 10% between the thermal expansion coefficients. The thermal expansion coefficient of the core was $11.2 \times 10^{-7}/°$ C.

Polarization dependency of branching ratio was measured, and found to be 0.2 dB, confirming that the optical waveguide of Example 2 had good characteristics.

Example 3

For Example 3, an optical waveguide was fabricated having the same structure as that of Example 1, except that the oxide-equivalent amounts of germanium (Ge) and boron (B) added to the buffer layer were 0.7 mol % and 1.2 mol %, respectively, the amounts of boron (B) and phosphorus (P) added to the upper cladding layer were 1.2 mol % and 1.0 mol %, respectively, and the amount of germanium (Ge) added to the core was 5.0 mol %. At wavelength 1550 nm, the refractive index of the buffer layer was 1.44739, that of the upper cladding layer was 1.44779 and that of the core was 1.45355, so the refractive index of the core was approximately 0.4% higher than that of the buffer layer and upper cladding layer.

The thermal expansion coefficient of the buffer layer was $7.0 \times 10^{-7}/°$ C. and that of the upper cladding layer was $7.9 \times 10^{-7}/°$ C., meaning that there was a difference of about 13% between the thermal expansion coefficients. The thermal expansion coefficient of the core was $11.0 \times 10^{-7}/°$ C.

Polarization dependency of branching ratio was measured, and found to be 0.4 dB, confirming that the optical waveguide of Example 3 had good characteristics.

Comparative Example 1

For Comparative Example 1, an optical waveguide was fabricated having the same structure as that of Example 1, except that just germanium (Ge) was added to the buffer layer, the oxide-equivalent amount of the addition being 0.7 mol %, the amounts of boron (B) and phosphorus (P) added to the upper cladding layer were 1.2 mol % and 1.0 mol %, respectively, and the amount of germanium (Ge) added to the core was 5.0 mol %. At 1550 nm, the refractive index of the buffer layer was 1.44775, that of the upper cladding layer was 1.44778 and that of the core was 1.45355, so the refractive index of the core was approximately 0.4% higher than that of the buffer layer and upper cladding layer.

The thermal expansion coefficient of the buffer layer was $5.8 \times 10^{-7}/°$ C. and that of the upper cladding layer was $7.9 \times 10^{-7}/°$ C., meaning that there was a difference of about 36% between the thermal expansion coefficients. The thermal expansion coefficient of the core was $11.0 \times 10^{-7}/°$ C.

Polarization dependency of branching ratio was measured, and found to be 0.6 dB, meaning that the optical waveguide of Comparative Example 1 did not have good characteristics.

Comparative Example 2

For Comparative Example 2, an optical waveguide was fabricated having the same structure as that of Example 1, except that just germanium (Ge) was added to the buffer layer, the oxide-equivalent amount of the addition being 1.0 mol %, the amounts of boron (B) and phosphorus (P) added to the upper cladding layer were 4.5 mol % and 2.0 mol %, respectively, and the amount of germanium (Ge) added to the core was 5.2 mol %. At wavelength 1550 nm, the refractive index of the buffer layer was 1.44815, that of the upper cladding layer was 1.44815 and that of the core was 1.45382, so the refractive index of the core was approximately 0.4% higher than that of the buffer layer and upper cladding layer.

The thermal expansion coefficient of the buffer layer was $6.2 \times 10^{-7}/°$ C. and that of the upper cladding layer was $12.9 \times 10^{-7}/°$ C., meaning that there was a difference of about 108% between the thermal expansion coefficients. The thermal expansion coefficient of the core was $11.2 \times 10^{-7}/°$ C.

Polarization dependency of branching ratio was measured, and found to be 1.1 dB, meaning that the optical waveguide of Comparative Example 2 did not have good characteristics.

Comparative Example 3

For Comparative Example 3, an optical waveguide was fabricated having the same structure as that of Example 1, except that the buffer layer was undoped, the oxide-equivalent amounts of boron (B) and phosphorus (P) added to the upper cladding layer were 4.5 mol % and 1.0 mol %, respectively, and the amount of germanium (Ge) added to the core was 4.8 mol %. At wavelength 1550 nm, the refractive index of the buffer layer was 1.4468, that of the upper cladding layer was 1.4468 and that of the core was 1.45328, so the refractive index of the core was approximately 0.4% higher than that of the buffer layer and upper cladding layer.

The thermal expansion coefficient of the buffer layer was $6.2 \times 10^{-7}/°$ C. and that of the upper cladding layer was $11.2 \times 10^{-7}/°$ C., meaning that there was a difference of about 81% between the thermal expansion coefficients. The thermal expansion coefficient of the core was $10.8 \times 10^{-7}/°$ C.

Polarization dependency of branching ratio was measured, and found to be 1.2 dB, meaning that the optical waveguide of Comparative Example 3 did not have good characteristics.

What is claimed is:

1. An optical waveguide, comprising:
   a silica substrate;
   a first buffer layer provided on the silica substrate, the first buffer layer having a thickness of not less than 1 μm and not more than 5 μm;
   at least one core provided on the first buffer layer; and
   an upper cladding layer provided on the first buffer layer and covering the core,
   wherein a thermal expansion coefficient of the first buffer layer and a thermal expansion coefficient of the upper cladding layer are substantially equal.

2. The optical waveguide as claimed in claim 1, wherein a refractive index of the first buffer layer is higher than a refractive index of the silica substrate.

3. The optical waveguide as claimed in claim 2, wherein a softening temperature of the upper cladding layer is lower than a softening temperature of the first buffer layer.

4. The optical waveguide as claimed in claim 3, wherein at least boron (B) and phosphorus (P) are added to the upper cladding layer.

5. The optical waveguide as claimed in claim 4, wherein at least germanium (Ge) is added to the first buffer layer.

6. The optical waveguide as claimed in claim 3, wherein at least germanium (Ge) is added to the first buffer layer.

7. The optical waveguide as claimed in claim 1, wherein a softening temperature of the upper cladding layer is lower than a softening temperature of the first buffer layer.

8. The optical waveguide as claimed in claim 7, wherein at least boron (B) and phosphorus (P) are added to the upper cladding layer.

9. The optical waveguide as claimed in claim 8, wherein at least germanium (Ge) is added to the first buffer layer.

10. The optical waveguide as claimed in claim 7, wherein at least germanium (Ge) is added to the first buffer layer.

11. The optical waveguide as claimed in claim 1, further comprising a second buffer layer interposed between the silica substrate and the first buffer layer, a thermal expansion coefficient of the second buffer layer being between a thermal expansion coefficients of the silica substrate and the first buffer layer.

12. The optical waveguide as claimed in claim 11, wherein a refractive index of the first buffer layer is higher than a refractive index of the silica substrate.

13. The optical waveguide as claimed in claim 12, wherein a softening temperature of the upper cladding layer is lower than a softening temperature of the first buffer layer.

14. The optical waveguide as claimed in claim 13, wherein at least boron (B) and phosphorus (P) are added to the upper cladding layer.

15. The optical waveguide as claimed in claim 14, wherein at least germanium (Ge) is added to the first buffer layer.

16. The optical waveguide as contained in claim 13, wherein at least germanium (Ge) is added to the first buffer layer.

17. The optical waveguide as claimed in claim 11, wherein a softening temperature of the upper cladding layer is lower than a softening temperature of the first buffer layer.

18. The optical waveguide as claimed in claim 17, wherein at least boron (B) and phosphorus (P) are added to the upper cladding layer.

19. The optical waveguide as claimed in claim 18, wherein at least germanium (Ge) is added to the first buffer layer.

20. The optical waveguide as claimed in claim 17, wherein at least germanium (Ge) is added to the first buffer layer.

* * * * *